April 16, 1940.  J. F. BRADY  2,197,292
HYDRAULIC VEHICLE WHEEL BRAKE
Filed Feb. 7, 1939  2 Sheets-Sheet 1

Inventor
John F. Brady

By Clarence A. O'Brien
and Hyman Berman
Attorneys

April 16, 1940.	J. F. BRADY	2,197,292
HYDRAULIC VEHICLE WHEEL BRAKE
Filed Feb. 7, 1939	2 Sheets—Sheet 2

Inventor
John F. Brady

By Clarence A. O'Brien
and Hyman Berman
Attorneys

Patented Apr. 16, 1940

2,197,292

UNITED STATES PATENT OFFICE 2,197,292

HYDRAULIC VEHICLE WHEEL BRAKE

John F. Brady, Sewickley, Pa., assignor of one-half to Edward J. Wright, Leetsdale, Pa.

Application February 7, 1939, Serial No. 255,156

1 Claim. (Cl. 188—152)

This invention relates to brakes for vehicle wheels and more particularly to a hydraulic brake for the wheels of motor vehicles.

In accordance with the present invention an hydraulic vehicle wheel brake is provided that will insure efficient brake action at all times and practically under any and all conditions; will require little, if any repair work, and practically no adjustment between replacement of brake linings.

The invention together with its objects and advantages will be best understood from a study of the following description taken in connection with the accompanying drawings wherein—

Figure 1:
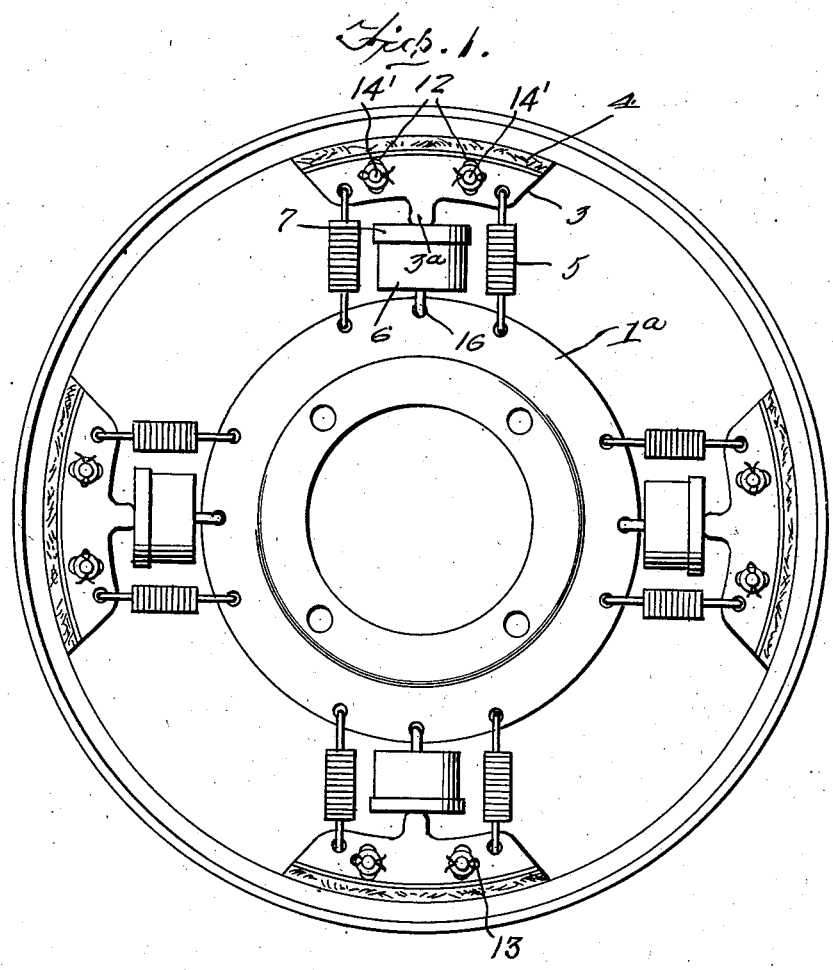
Figure 1 is an elevational view of the brake.
Figure 4:
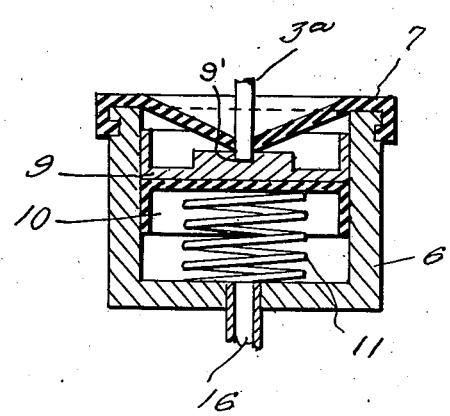
Figure 2:
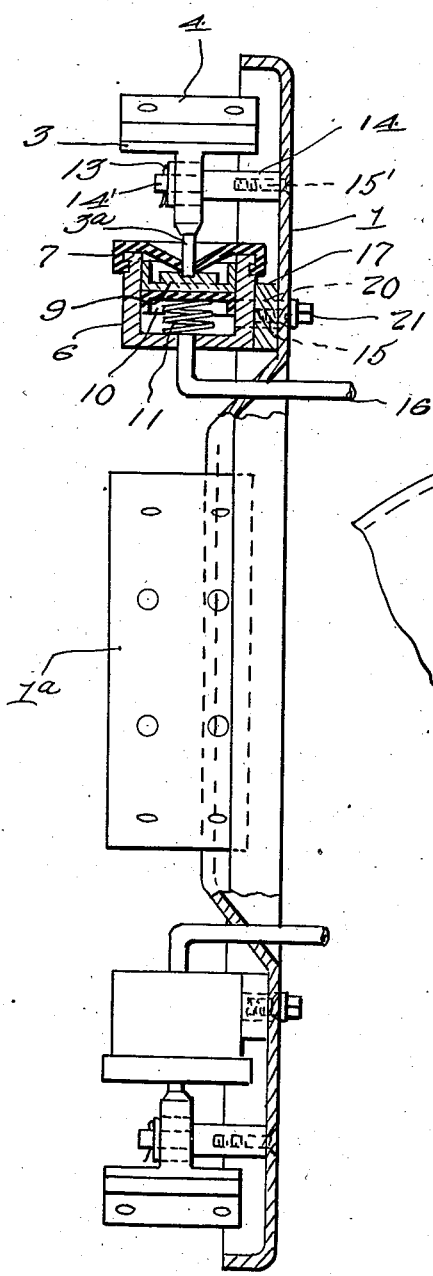
Figure 2 is a longitudinal sectional view therethrough.
Figure 3:
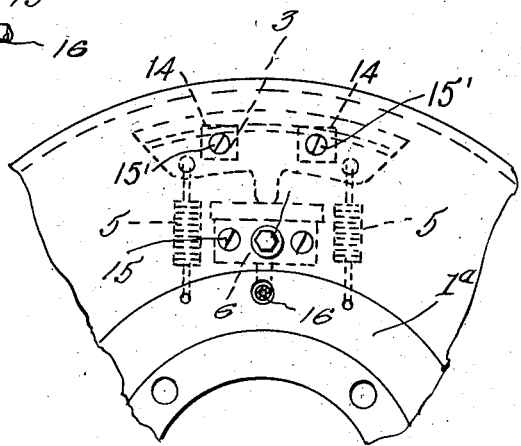
Figure 3 is a fragmentary side elevational view illustrating certain features hereinafter more fully referred to, and Figure 4 is a sectional view through an oil cylinder forming part of the invention.

Referring more in detail to the drawings it will be seen that 1 indicates generally the end or cover plate for the drum of a vehicle wheel and adapted to be mounted in a more or less conventional manner on the axle housing in proper association with the brake drum (not shown).

In accordance with the present invention the brake is provided with four segmental brake shoes 3 equi-distantly spaced apart.

Each brake shoe 3 is mounted on the plate 1 through the medium of spacer blocks 14 secured to the plate 1 through the medium of screws or other fastening elements 15'.

Each spacer block 14 is provided with a pair of spaced guide pins 14' and to accommodate the pins 14' the body of each shoe 3 is provided with slots 12 permitting proper radial movement of the shoe. The shoes are retained in proper engagement with the guide pins 14' through the medium of washer and cotter pin assemblies indicated generally by the reference numeral 13.

For each brake shoe 3 there is provided an hydraulic cylinder 6 in which operates a piston 9.

Each cylinder 6 is provided with a cap 7 of rubber or other suitable material and the cap 7 at the center thereof is provided with a slot to accommodate an extension 3a of the brake shoe. The extension 3a of the shoe extends through the slot in the cap 7 and is engaged by the piston 9 so that movement of the piston, in response to hydraulic pressure will be transmitted to the shoe 3 for moving the same into braking engagement with the flange of the brake drum. The extension 3a is flat and of considerable width with its end engaging a slot 9' in the piston 9.

Each cylinder 6 is mounted on the plate 1 of the brake through the medium of a combination bracket and spacer plate 17 mounted on the plate 1 through the medium of screws or other fastening elements 15.

The wall of each cylinder 6, the spacer plate 17, and the brake plate 1 are provided with aligned openings forming for each cylinder a drain outlet for which there is provided a suitable plug 21.

The fluid from the master cylinder of the hydraulic brake system is supplied to the brake cylinders 6 through the medium of conduits 16 that connect with the cylinders 6 as clearly shown.

Each brake shoe 3 is yieldably retained in a released position through the medium of pairs of coil springs 5.

The coil springs 5 are suitably connected at one end thereof with a brake shoe and at an opposite end thereof with an anchoring annulus or flange 1a.

It will thus be seen that when the brakes are applied the fluid from the master cylinder of the hydraulic brake system will feed to the cylinders 6 through the conduits 16 and act on the pistons 9 in a manner to force the brake shoes 3 into brake-applying engagement with the brake drum.

Upon release of the fluid pressure on the pistons 9 springs 5 will act on the shoes to retract the same, that is to move the shoes inwardly out of engagement with the brake drum.

The shoes 3 are equipped in the usual manner with linings 4, and in actual practice it will be found that regardless of the wear on the linings 4, or the condition of such linings the shoes 3 will at all time have proper contact with the drum to insure a positive and efficient braking action.

Also, and as shown for each piston 9 there is provided a cup washer 10 and interposed between the washer 10 and the end wall of each cylinder is a coil spring 11 which will prevent the washer 10 from seating at the inner end of the cylinder and thus prevent proper flow of fluid into the cylinder.

It is thought that a clear understanding of the construction, utility, operation and advantages of a vehicle wheel brake embodying the features of the present invention will be had without a more detailed description.

Having thus described the invention what is claimed as new is:

In a hydraulic brake for vehicle wheels, a stationary back plate, posts carried by the plate and each having a spaced pair of projections on its free end, a plurality of brake shoes each including a flange portion having slots therein through which the projections pass, a flat centrally arranged extension at the inner edge of each flange part, a plurality of hydraulic cylinders, blocks connected with side portions of said cylinders and with the back plate, a piston in each cylinder having a slot in its outer face for receiving the flat extension of a brake shoe, means for introducing compressed fluid into the cylinders to move the pistons outwardly, a pair of springs connecting the flange part of each brake shoe with a stationary part of the back plate to normally hold the shoe in inoperative position, the cylinder being arranged between said springs and a drain conduit passing from an interior of the cylinder through the supporting block and a portion of the back plate and a plug for closing that part of the conduit which passes through the back plate.

JOHN F. BRADY.